US006956960B2

(12) United States Patent
Kondo et al.

(10) Patent No.: US 6,956,960 B2
(45) Date of Patent: *Oct. 18, 2005

(54) IMAGE PROCESSING DEVICE, IMAGE PROCESSING METHOD, AND STORAGE MEDIUM

(75) Inventors: Tetsujiro Kondo, Tokyo (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/360,419

(22) Filed: Feb. 7, 2003

(65) Prior Publication Data

US 2003/0118105 A1 Jun. 26, 2003

Related U.S. Application Data

(62) Division of application No. 09/538,019, filed on Mar. 29, 2000.

(30) Foreign Application Priority Data

Mar. 29, 1999 (JP) ............................................. 11-085579
Mar. 23, 2000 (JP) ....................................... 2000-081365

(51) Int. Cl.[7] ............................................... G06K 9/00
(52) U.S. Cl. ................... 382/107; 375/240.16; 348/155
(58) Field of Search ................................ 392/103, 104, 392/107, 192–194; 73/488; 348/154, 155; 356/27

(56) References Cited

U.S. PATENT DOCUMENTS 5,557,684 A * 9/1996 Wang et al. ................. 382/107
5,586,202 A * 12/1996 Ohki et al. .................. 382/236
5,649,032 A    7/1997 Burt et al.
5,694,487 A * 12/1997 Lee ............................ 382/201
5,706,367 A    1/1998 Kondo
6,078,701 A    6/2000 Hsu et al.
6,157,677 A * 12/2000 Martens et al. ......... 375/240.16
6,343,100 B1 * 1/2002 Fujiwara et al. ........ 375/240.17
6,414,995 B2 * 7/2002 Okumura et al. ....... 375/240.16
6,442,203 B1 * 8/2002 Demos ................... 375/240.16
6,456,660 B1 * 9/2002 Yokoyama ............. 375/240.16
6,463,164 B1 * 10/2002 Chiu et al. .................. 382/107
6,493,390 B2 * 12/2002 Miyaji et al. ........... 375/240.16
6,542,548 B2 * 4/2003 Nakaya et al. ......... 375/240.17

FOREIGN PATENT DOCUMENTS

JP          9-037259         2/1997
JP         11-112871         4/1999

* cited by examiner

*Primary Examiner*—Samir Ahmed
*Assistant Examiner*—Anand Bhatnagar
(74) *Attorney, Agent, or Firm*—Frommer Lawrence & Haug LLP; William S. Frommer; Thomas F. Presson

(57) ABSTRACT

An image processing device for calculating the motion direction of each pixel in a predetermined screen of interest from among a plurality of time series screens. The image processing device includes a score calculator for calculating a score corresponding to each of a plurality of motion directions of each pixel in the predetermined screen of interest, based on pixels present in the motion direction across the plurality of the time series screens, and a motion direction calculator for calculating the motion direction of each pixel in the predetermined screen of interest, by processing the plurality of the motion directions based on the scores corresponding to the plurality of the motion directions. The image processing device thus performs a highly accurate motion direction detection process within a short calculation time.

17 Claims, 14 Drawing Sheets

RELATIONSHIP BETWEEN MOTION
OF vx AREA AND SCORE

RELATIONSHIP BETWEEN STILL
OF vx AREA AND SCORE

IMAGE PROCESSING DEVICE, IMAGE PROCESSING METHOD, AND STORAGE MEDIUM

CROSS-REFERENCE TO RELATED APPLICATION

This application is a divisional of U.S. application Ser. No. 09/538,019, filed Mar. 29, 2000.

BACKGROUND OF THE INVENTION

1. Field of the Invention

The present invention relates to an image processing device, an image processing method, and a storage medium, and, more particularly, to an image processing device for extracting a motion area and a still area from an image (a moving image), and an image processing method and a storage medium for the image processing device.

2. Description of the Related Art

A conventional image processing device for extracting a moving object from a moving image detects a motion vector for each pixel using block matching from successively input several frames, and corrects the motion vector using neighboring motion vectors in space in alignment with the motion vector. The motion vector subsequent to the correction is assessed by performing block matching for the motion vector. Based on the score resulting from the assessment, the motion vector is recursively corrected to result in a highly reliable motion vector. A moving object is thus extracted based on the finally obtained motion vector.

For instance, such an image processing device sets up an 8×8 pixel block in connection with a pixel of interest, and performs block matching using the block. Specifically, the image processing device calculates the sum of squared differences, each difference between the value of each pixel in a block including a pixel of interest and the value of a corresponding pixel in a block of an adjacent frame, namely, a prediction error, and determines a block of an adjacent frame that results in a minimum prediction error (hereinafter referred to as a minimum prediction error block). The motion vector of the pixel of interest is thus determined from the positional relationship between the block of the pixel of interest and the minimum prediction error block.

All pixels in a frame of interest are successively treated as a pixel of interest to determine the motion vector, and the motion vector of each pixel is thus corrected.

Focusing one pixel, the motion vector thereof is corrected using the weight corresponding to a prediction error (a prediction error obtained when the motion vector is determined) of the motion vector of a pixel in space close to the pixel of interest. The prediction error of the motion vector subsequent to the correction is calculated using the block of the pixel of interest and the block in an adjacent frame in a position shifted from the position of the first block by a distance corresponding to the corrected motion vector. The prediction error is used to assess the motion vector subsequent to the correction, while being used as a weight for the correction of the motion vector at the same time.

The correction of the motion vector is recursively performed on all pixels in a frame of interest until the sum of the prediction errors of the motion vectors of the pixels converges.

SUMMARY OF THE INVENTION

Accordingly, it is an object of the present invention to provide an image processing device free from the above problem.

An image processing device for calculating the motion direction of each pixel in a predetermined screen of interest from among a plurality of time series screens, includes a score calculator unit for calculating a score corresponding to each of a plurality of motion directions of each pixel in the predetermined screen of interest, based on pixels present in the motion direction across the plurality of the time series screens, and a motion direction calculator unit for calculating the motion direction of each pixel in the predetermined screen of interest, by processing the plurality of the motion directions based on the scores corresponding to the plurality of the motion directions.

DESCRIPTION OF THE PREFERRED EMBODIMENTS

Figure 1:
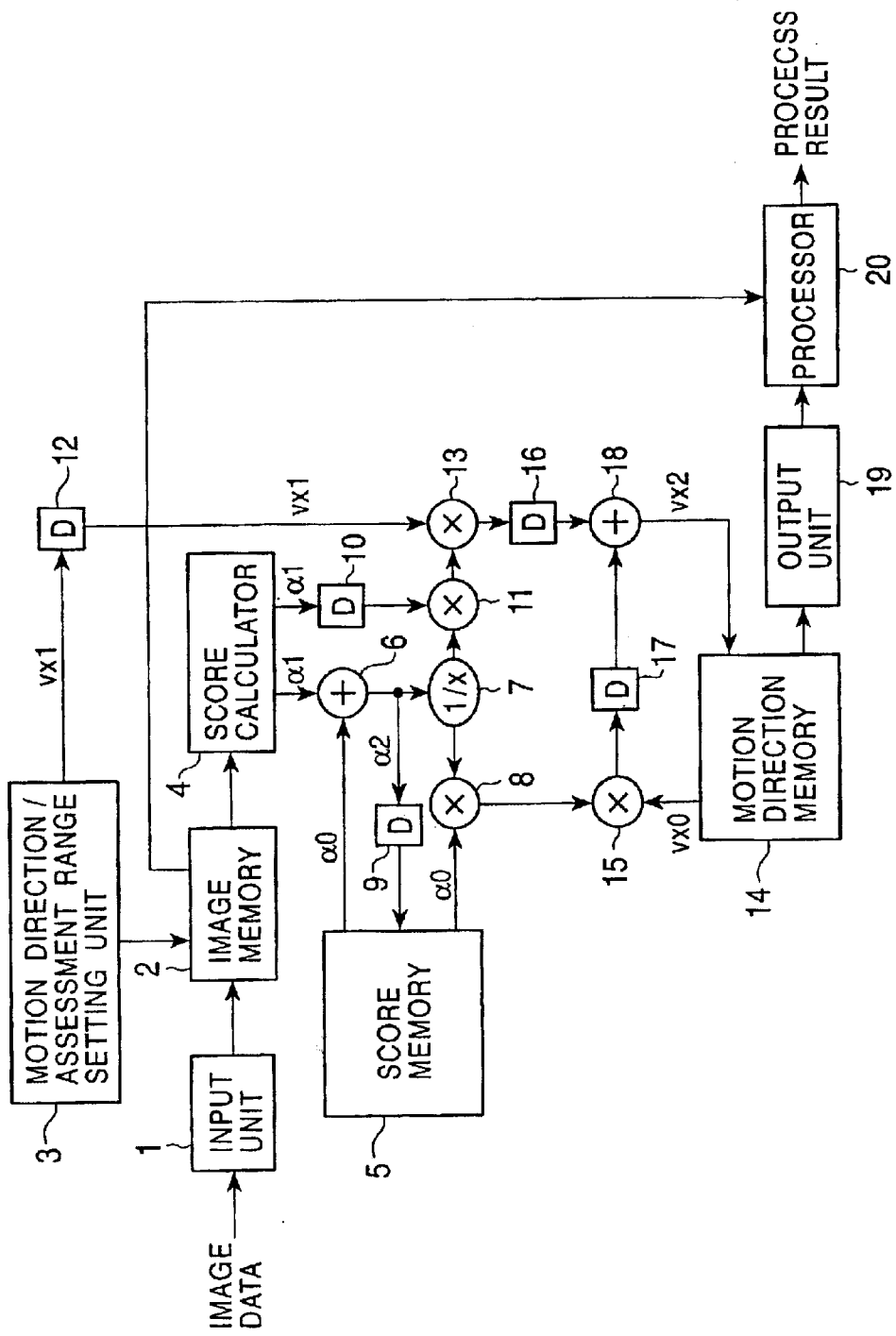
FIG. 1 is a block diagram of an image processing device of a first embodiment of the present invention.

FIG. 1 is a block diagram of the hardware of a first embodiment of an image processing device of the present invention.

In this image processing device, all frames forming a series of moving image are once stored, a motion detection process is performed to detect the motion direction of a particular frame of interest, and a predetermined process is performed on the stored image data using the detected result about the motion direction.

An input unit 1 is arranged to successively receive image data of time series frames forming a series of moving images (for instance, a 4:2:2 YUV signal or an RGB (Red, Green, and Blue) signal). The input unit 1 feeds the image data of each frame to an image memory 2. The image memory 2 includes a plurality of frame memories, and is arranged to temporarily store the image data of a plurality of frames forming a series of moving images supplied to the input unit 1.

A motion direction and assessment range setting unit 3 treats, as a frame of interest, each of a plurality of frames stored in the image memory 2. Each pixel of the frame of interest is then treated as a pixel of interest. A plurality of motion directions of the pixel of interest is successively set. The plurality of the motion directions set for the pixel of interest, Vx1, is fed to a delay circuit 12.

The motion direction and assessment range setting unit 3 shifts a range of pixels (also referred to as an assessment range) used to calculate a score (indicating whether the set motion direction is correct as the motion direction of the pixel of interest) for the motion direction, based on pixels present in the motion direction set for the pixel of interest in the plurality of the frames stored in the image memory 2. The pixel in the assessment range set by the motion direction and assessment range setting unit 3 is then read from the image memory 2, and is fed to a score calculator 4.

The score calculator 4 calculates the score for the motion direction of the pixel of interest set by the motion direction and assessment range setting unit 3 using the pixel within the assessment range supplied by the image memory 2, and is fed to a calculator 6 and a delay circuit 10.

Based on the pixel value of the pixel of interest and the pixel value of the pixel within the assessment range, the score calculator 4 calculates the variance of the pixel value, and determines the reciprocal of the variance as a score $\alpha 1$ for the motion direction set for the pixel of interest. Alternatively, the score calculator 4 successively selects the pixel values of adjacent pixels present in the direction between the pixel value of the pixel of interest and the pixel value of the pixel within the assessment range, calculates the mean square of differences therebetween, i.e., a value representing continuity of the pixels, and determines, as a score $\alpha 1$ for the motion direction set for the pixel of interest, the reciprocal of the mean square. When the motion direction set by the motion direction and assessment range setting unit 3 is correct as the motion direction of the pixel of interest, a large score results. Conversely, when the motion direction set by the motion direction and assessment range setting unit 3 is not correct, a small score results.

A score memory 5 stores the score of the motion direction of each pixel in the frame of interest. The score memory 5 outputs the scores to calculators 6 and 8. The score memory 5 updates the stored score of the motion direction for each pixel in the frame of interest with the score of the motion direction supplied by a delay circuit 9.

As already discussed, the calculator 6 is supplied with the score $\alpha 1$ of the motion direction of the pixel of interest determined by the score calculator 4, and a score $\alpha 0$ of the motion direction of the pixel of interest already stored in the score memory 5. The calculator 6 updates the score of the motion direction of the pixel of interest already stored in the score memory 5 by summing the scores $\alpha 1$ and $\alpha 0$, and feeds a resulting score $\alpha 2$ to a calculator 7 and the delay circuit 9.

The calculator 7 calculates the reciprocal of the score from the calculator 6, and feeds the reciprocal to a calculator 8 and a calculator 11. The calculator 8 multiplies the output of the calculator 7 by the score $\alpha 0$ of the score memory 5, and feeds the product to a calculator 15. The delay circuit 9 delays the score $\alpha 2$ from the calculator 6 by a predetermined duration of time, before feeding the score $\alpha 2$ to the score memory 5. The delay circuit 10 delays the score $\alpha 1$ determined by the score calculator 4 by a predetermined duration of time, before feeding the score $\alpha 1$ to the calculator 11. The calculator 11 multiplies the output of the delay circuit 10 by the output of the calculator 7, and feeds the product to a calculator 13. The delay circuit 12 delays the motion direction supplied by the motion direction and assessment range setting unit 3 by a predetermined duration of time, before feeding the motion direction to the calculator 13. The calculator 13 multiplies the output of the calculator 11 by the output of the delay circuit 12, and feeds the product to a delay circuit 16.

A motion direction memory 14 stores the motion direction for each pixel in the frame of interest, and outputs the stored motion direction to the calculator 15. The motion direction memory 14 updates the stored motion direction for each pixel in the frame of interest with the motion direction update supplied by a calculator 18.

The calculator 15 multiplies the motion direction Vx0 of the pixel of interest already stored in the motion direction memory 14 by the output of the calculator 8, and outputs the product to a delay circuit 17. The delay circuit 16 delays the output of the calculator 13 by a predetermined duration of time, before feeding the output of the calculator 13 to the calculator 18. The delay circuit 17 delays the output of the calculator 15 by a predetermined duration of time, before feeding it to the calculator 18. The calculator 18 sums the output of the delay circuit 16 and the output of the delay circuit 17, thereby determining an update of the motion direction of the pixel of interest already stored in the motion direction memory 14, and feeding the motion direction update Vx2 to the motion direction memory 14.

An output unit 19 reads the finally obtained motion direction for each pixel in the frame of interest from the motion direction memory 14, and feeds it to a processor 20. The processor 20 is also supplied with the image data from the image memory 2. The processor 20 performs a predetermined process on the input image data using the motion direction supplied by the output unit 19.

The processor 20 detects corresponding pixels across the frames (i.e., pixels that constitute part of the same object in an image) in accordance with the motion direction from the output unit 19, and sums these pixels to remove noise from the image. The processor 20 also detects a still area in the frames based on the motion direction from the output unit 19, and sums corresponding pixels across the frames, forming the still area, thereby creating a background of the image.

Figure 2:
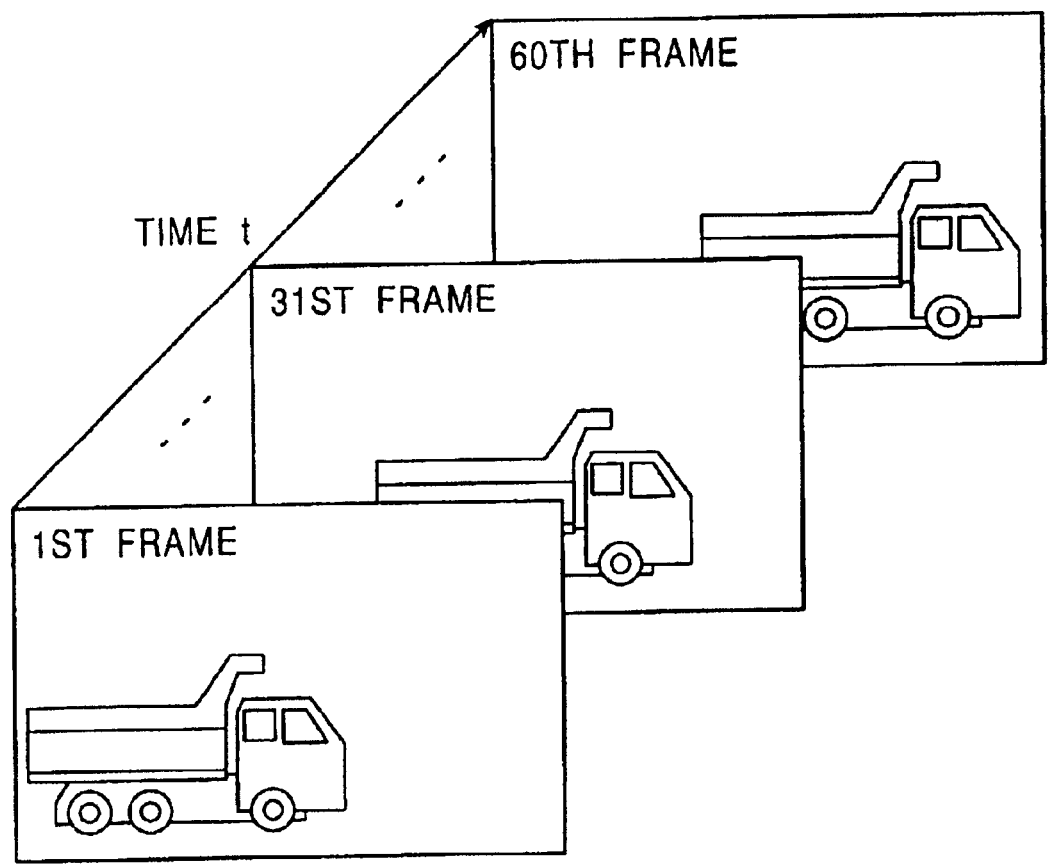
FIG. 2 is a diagram explaining a moving image, which is an object to be processed by the image processing device of FIG. 1.

The motion direction detection process performed by the image processing device thus constructed is discussed. For simplicity, a moving image to be processed in the motion direction detection process is a truck as a solid body as shown in FIG. 2. Time series of 60 frames of the truck are now moving from left to right in one direction at a constant speed. If the number of frames, as the unit of the motion direction detection process, is small, no problem will be presented by the assumption that the solid body is moving in the fixed direction at the constant speed.

Figure 3:
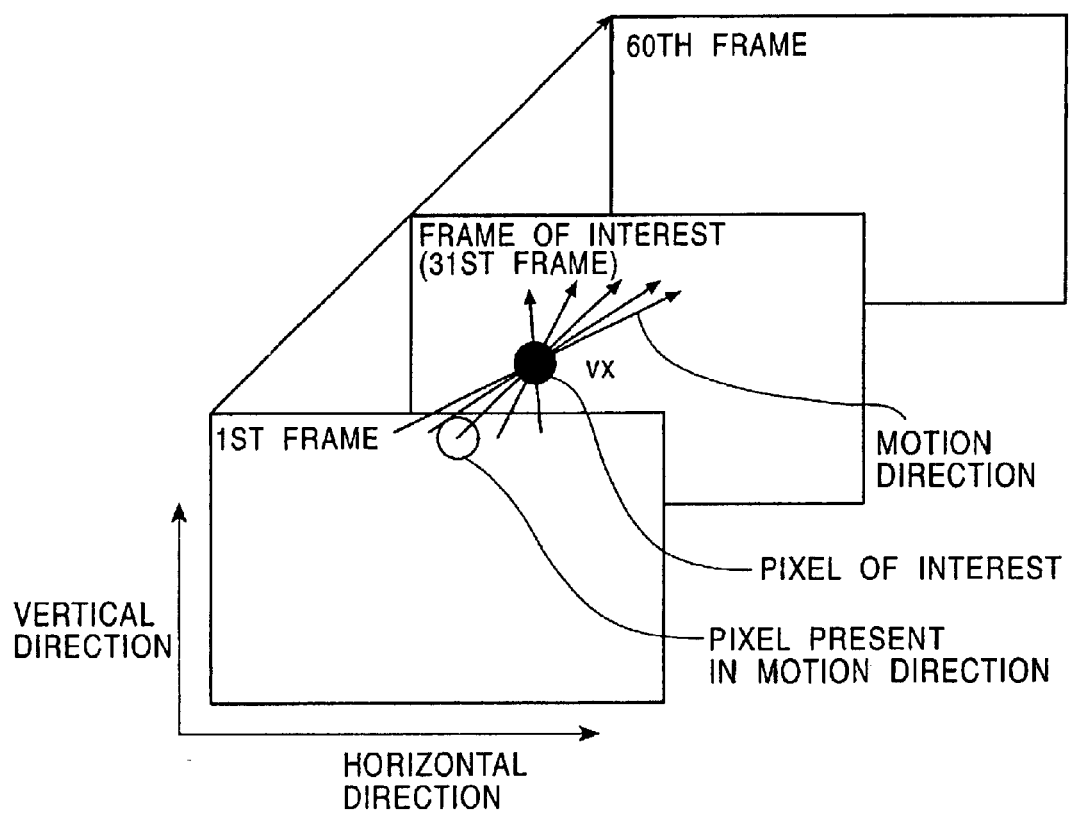
FIG. 3 shows a frame of interest and the motion direction of a pixel set up in the frame of interest during the image processing by the embodiment of the present invention.
Figure 4:
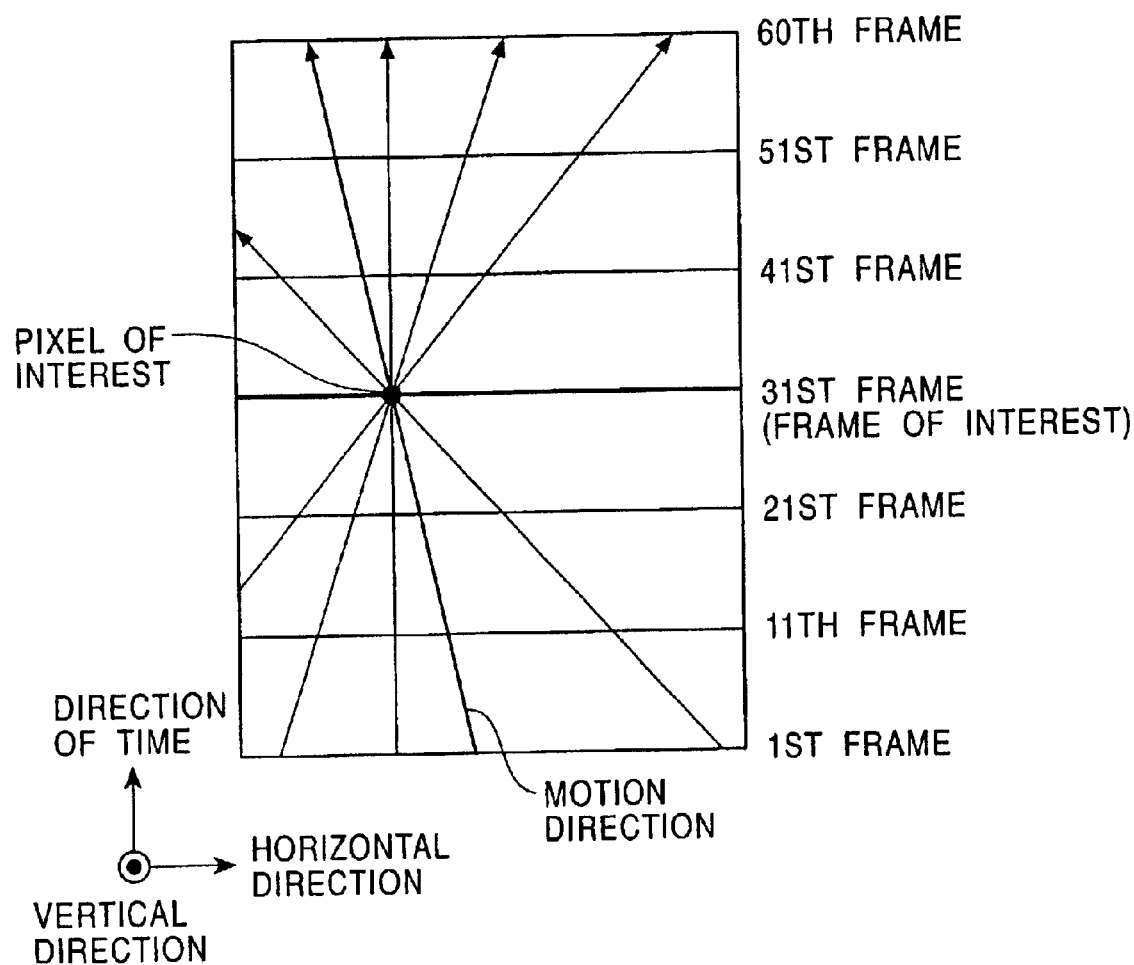
FIG. 4 shows the motion direction of the pixel set up in the frame of interest during the image processing by the embodiment of the present invention.

As shown in FIG. 3, the motion direction detection process, one given frame of the time series 60 frames shown in FIG. 2 is a frame of interest. A 31st frame (from the first frame) is here the frame of interest as shown in FIG. 3.

The pixels of the frame of interest are successively treated as a pixel of interest, and a plurality of motion directions are set for the pixel of interest. Since the solid body presented in the image to be treated in the motion direction detection process moves from left to right, only a horizontal direction is a concern. Successively set as motion directions for the pixel of interest are straight lines connecting the pixel of interest to pixels in a horizontal direction centered on a pixel at the same position as that of the pixel of interest in a next frame subsequent to the frame of interest (a 32nd frame here). Specifically, the coordinates of a pixel positioned at an x-th column from left and a y-th row from below in a t-th frame are (t, x, y). The coordinates of the pixel of interest in the frame of interest are (T, X, Y). The straight lines connecting the point (T, X, Y) in the T-th frame to (T+1, X−1, Y), (T+1, X, Y), (T+1, X+1, Y), . . . in the (T+1)-th frame are successively set up as the motion directions of the pixel of interest.

More specifically, the straight lines 33 respectively connecting the pixel of interest (31, X, Y) in the 31st frame (the pixel of interest) to pixels (32, X−16, Y), (32, X−15, Y), . . . , (32, X, Y), . . . , (32, X+15, Y), and (32, X+16, Y) in the 32nd frame are successively set up as the motion directions of the pixel of interest (31, X, Y). The motion direction Vx, i. e., the direction of the straight line connecting the pixel of interest (T, X, Y) to pixel (T+1, X+m, Y) is represented by m.

The motion directions of the pixel interest are set up not only in straight lines extending to pixels present in a horizontal direction centered on the pixel corresponding to the pixel of interest in the next frame subsequent to the frame of interest, but also in straight lines extending to pixels present in a vertical direction or a diagonal direction centered on the corresponding pixel. Specifically, the straight line connecting the pixel of interest (T, X, Y) to a pixel (T+1, X+m, Y+n) may be set up. In this case, the motion direction V is represented by (m, n).

When a certain motion direction is set up for a pixel of interest, the straight line passing through the pixel of interest passes at least through pixels of some of the 60 frames to be treated in the motion direction detection process. The pixel through which the straight line passes is a pixel present in the motion direction. Based on the pixels present in the motion direction, a score for the motion direction (a measure representing how exact the movement of the pixel of interest agrees with the motion direction) is calculated. A plurality of motion directions set up for the pixel of interest are subjected to a weighted sum operation with the score in each motion direction accounted for as a weight. The motion direction of the pixel of interest is thus finally obtained.

The motion direction detection process thus determines the score for assessing how exact the shifting of the pixel of interest in the frame of interest agrees with the direction of a straight line, based on the pixels in each frame present in the straight line passing through the pixels of the frame of interest. The motion direction of each pixel is thus obtained with a small amount of calculation involved, compared with an assessment calculation by block matching which requires an increased amount of calculation due to the setup of blocks for each pixel.

Now, the number of pixels in each frame in a straight line passing through a pixel in a frame of interest and the number of pixels in a block formed for a given pixel in a frame of interest are both equal to N in the motion direction detection process. In the block matching, 2N pixels, namely, N pixels of the block for the given pixel and N pixels of a block in an adjacent frame, are used to calculate the prediction error, corresponding to the score. In the motion direction detection process, the N pixels are used to calculate the score. Thus, a smaller amount of calculation is involved.

In the motion direction detection process, the motion directions set up for the pixel of interest are subjected to a weighted sum operation with the score in each motion direction accounted for as a weight. The motion direction of the pixel of interest is thus finally obtained. A recursive calculation of the score, as is performed in a conventional object extraction, is not needed. This also helps reduce the amount of calculation.

In accordance with the motion direction detection process, the image data of all 60 frames, namely, data in the time direction is effectively used to determine the final motion direction of each pixel in the frame of interest. The motion direction detection process thus results in an accurate and reliable motion direction, compared with the conventional object extraction which performs block matching using only the frame of interest and the frame adjacent thereto.

Theoretically, the conventional object extraction may perform block matching between the frame of interest and each of the remaining frames, thereby assessing an overall prediction error resulting from the block matching. Making efficient use of the data in the time direction in the same manner as in the motion direction detection process, the conventional object extraction process may provide an accurate and reliable motion direction. However, performing block matching between the frame of the pixel of interest and each of the remaining frames is impracticable in view of the amount of calculation. In contrast, the motion direction detection process obtains a highly accurate and reliable motion direction with a smaller amount of calculation involved as already discussed above.

Figure 5:
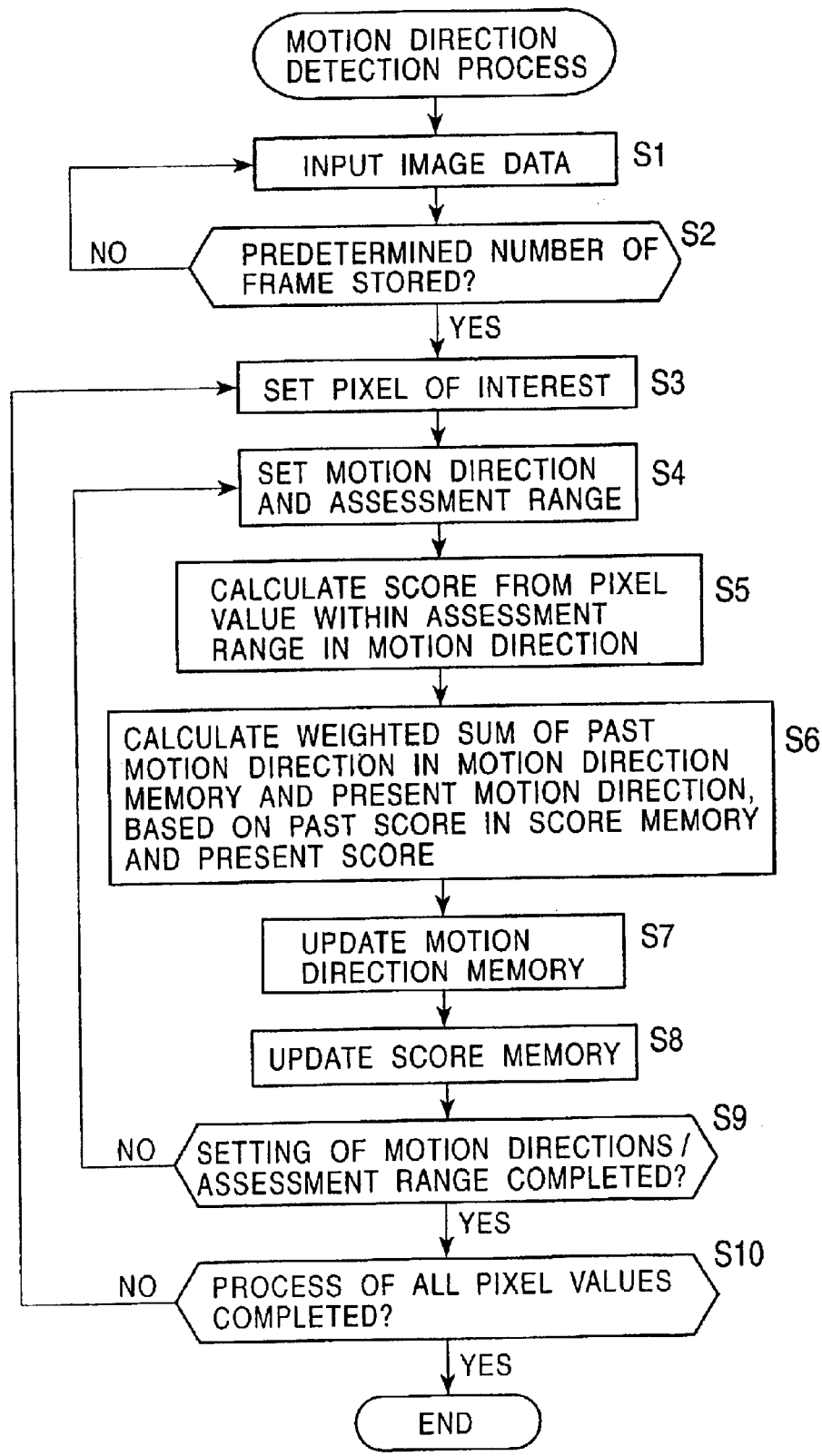
FIG. 5 is a flow diagram explaining a detection process of the motion direction by the image processing device of FIG. 1.

The motion direction detection process performed by the image processing device shown in FIG. 1 is further discussed, referring to a flow diagram shown in FIG. 5.

In step S1, the image data is input to the input unit 1, and is then fed to and stored in the image memory 2. A controller (not shown) determines in step S2 whether the image data of a predetermined number of frames is stored in the image memory 2. When the controller determines that the image data of the predetermined number of frames has not yet been stored, the process returns to step S1, where the next input image data is fed to and stored in the image memory 2.

When the controller determines in step S2 that the image data of the predetermined number of frames has been stored in the image memory 2, a frame of interest is set up, and the process goes to step S3. The frame of interest may be set up by detecting frames in which an entire moving object appears in the device, and one of the frames is selected as the frame of interest. Alternatively, the selection of the frame of interest may be left to the user's setting.

In step S3, one pixel in the frame of interest is set up as a pixel of interest. The process goes to step S4. The motion direction and assessment range setting unit 3 sets the motion direction and the assessment range for the pixel of interest in step S4.

The motion direction and assessment range setting unit 3 first sets up the motion directions of the pixel of interest.

A point where the straight line in the motion direction passing through the pixel of interest intersects a first frame or a frame closest to the first frame, from among the frames to be processed in the motion direction detection process, is referred to as a start point. A point where the straight line intersects a last frame or a frame closest to the last frame is referred to as an end point. A line segment connecting the start point to the end point is referred to as a motion direction line.

Figure 6:
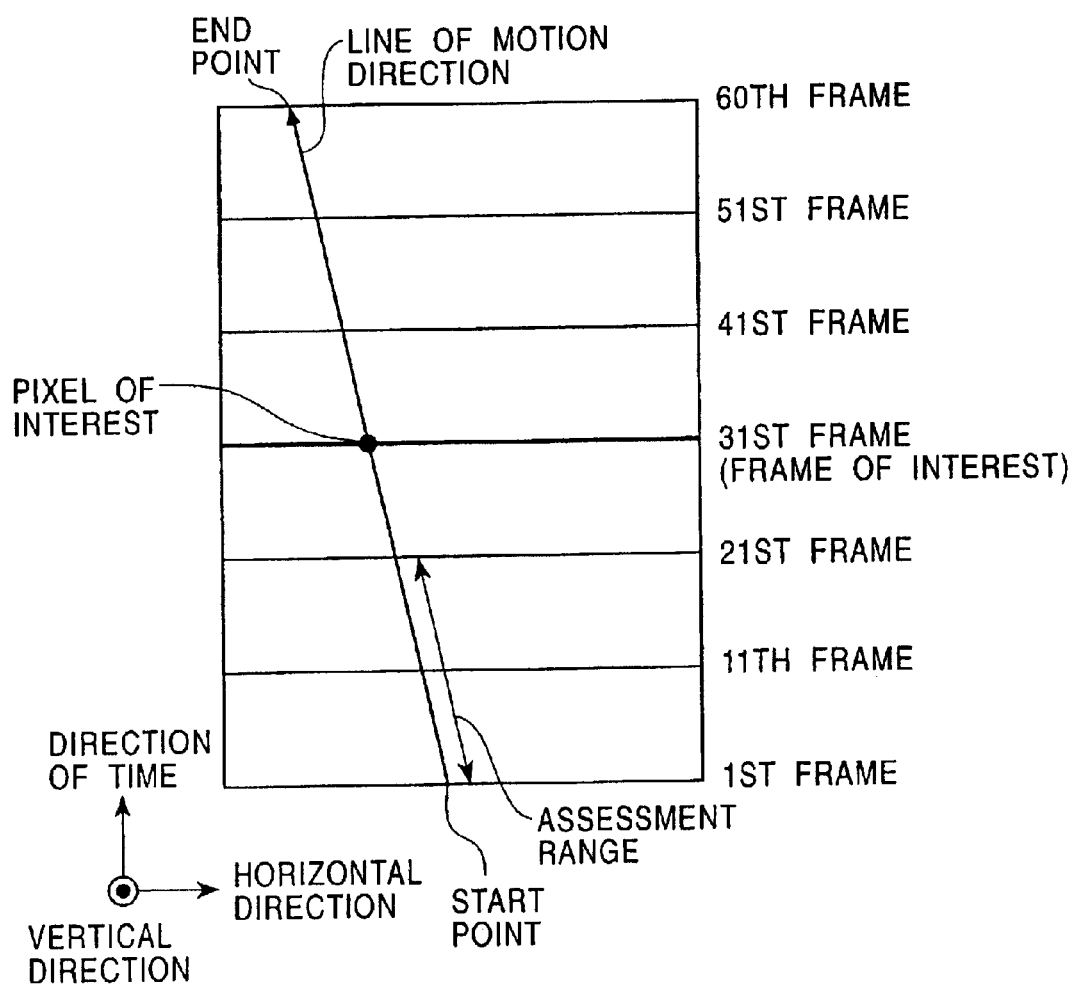
FIG. 6 explains the motion direction and an assessment range during the image processing in accordance with the embodiment of the present invention.

When a motion direction is set up for the pixel of interest, a single motion direction line is determined as shown in FIG. 6. The motion direction and assessment range setting unit 3 sets, as an assessment range, a range of pixels present in the motion direction line from the frame of the start point of the motion direction line to a frame spaced by a predetermined number of frames (20 frames, for instance).

When the motion direction and assessment range setting unit 3 sets up the assessment range, steps S5 through S8 are performed using the pixels within the assessment range. When the controller determines in step S9 that the setting of all motion directions and the assessment ranges of all motion directions have not been completed, the process returns to step S4. Unset motion directions and assessment ranges are set. The setting of these is performed in the following sequence, for instance.

Figure 7A:
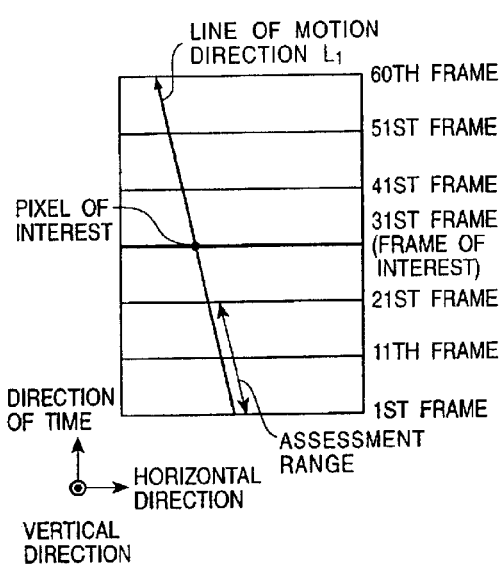
FIG. 7A shows a first example of the motion direction and the assessment range by the motion direction and assessment range setting unit.
Figure 7B:
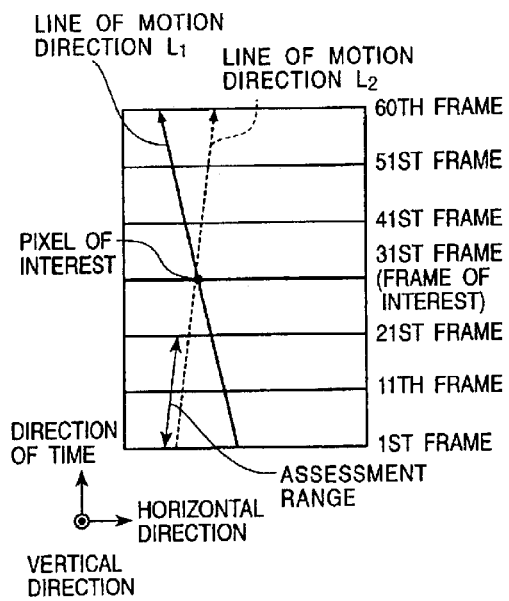
FIG. 7B shows a second example of the motion direction and the assessment range by the motion direction and assessment range setting unit.

Referring to FIG. 7A, the motion direction and assessment range setting unit 3 sets up a motion direction and determines, as an assessment range, a pixel range in the motion direction line L1 starting from a frame having a start point therewithin and extending through a predetermined number of frames from the start point frame. Referring to FIG. 7B, the motion direction and assessment range setting unit 3 sets up another motion direction and determines, as another assessment range, a pixel range in another motion direction range L2 starting from a frame having a start point therewithin and extending through a predetermined number of frames. For unset motion directions, assessment ranges from the start frames in the motion direction lines are set in the same manner.

For all motion directions, the pixel ranges in the motion direction lines from the start point thereof extending through a predetermined number of frames are set up. The pixel range set for the first motion direction line L1 is then shifted toward the end point by one frame.

Figure 7C:
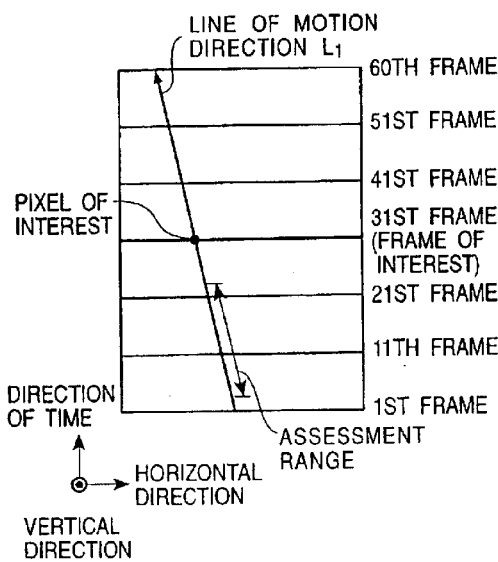
FIG. 7C shows a third example of the motion direction and the assessment range by the motion direction and assessment range setting unit.
Figure 7D:
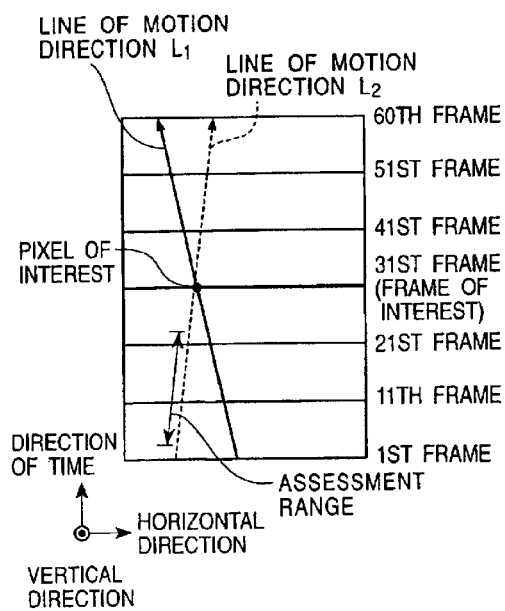
FIG. 7D shows a fourth example of the motion direction and the assessment range by the motion direction and assessment range setting unit.

Referring to FIG. 7C, a pixel range in the motion direction line L1 extending through a predetermined number of frames from the next frame subsequent to the frame of the start point is set up as an assessment range. Referring to FIG. 7D, a motion direction, similar to the one shown in FIG. 7B, is set up, and a pixel range in the motion direction line L2 exceeding through a predetermined number of pixels is set up as an assessment range. Similarly, unset motion directions and assessment ranges thereof are set until one end of the assessment range reaches the end point of the motion direction line.

When the motion direction and assessment range setting unit 3 sets a motion direction $Vx1$ and the assessment range thereof in step S4, the motion direction $Vx1$ is output to and delayed by the delay circuit 12 by a predetermined duration of time. The motion direction $Vx1$ is then fed to the calculator 13. The pixel within the assessment range is read together with the pixel of interest from the image memory 2, and is then fed to the score calculator 4.

In step S5, the score calculator 4 calculates the variance of the pixels within the assessment range and the pixel of interest from the image memory 2, and outputs the reciprocal of the variance as a score $\alpha1$ for the motion direction $Vx1$. The score $\alpha1$ is fed to the calculator 6, while being fed to the calculator 11 through the delay circuit 10 at the same time.

The calculator 6 receives the score $\alpha0$ of the motion direction of the pixel of interest from the score memory 5. The calculator 6 sums the score $\alpha0$ and the score $\alpha1$ from the score calculator 4, thereby updating the score $\alpha0$ stored in the score memory 5. The new score $\alpha2$ is thus determined by the following equation.

$$\alpha2=\alpha0+\alpha1 \qquad(1)$$

The calculator 6 thus updates the score $\alpha0$ stored in the score memory 5 using the score $\alpha1$ right now obtained by the score calculator 4, thereby resulting in the new score $\alpha2$. The score update $\alpha2$ is then fed to the score memory 5 through the delay circuit 9, as a score for a motion direction update $Vx2$, which will be discussed later. The score $\alpha2$ is also fed to the calculator 7.

The process goes to step S6. The motion direction $Vx1$ of the pixel of interest already stored in the motion direction memory 14 is updated through a circuit arrangement including the calculators 7, 8, 11, 13, 15, and the delay circuits 16 and 17, and the calculator 18.

More specifically, the calculator 7 calculates the reciprocal $(1/\alpha2=1/(\alpha0+\alpha1))$ of the new score $\alpha2$ $(=\alpha1+\alpha2)$ output by the calculator 6, and feeds the reciprocal to both the calculator 8 and the calculator 11. The calculator 8 reads the score $\alpha0$ of the pixel of interest from the score memory 5, and multiplies the score $\alpha0$ by the output $(1/(\alpha0+\alpha1))$ of the calculator 7. The product $(\alpha0/(\alpha0+\alpha1))$ is fed to the calculator 15. The calculator 11 multiplies the score $\alpha1$, determined by the score calculator 4 and provided through the delay circuit 10, by the output $(1/(\alpha0+\alpha1))$ of the calculator 7. The resulting product $(\alpha1/(\alpha0+\alpha1))$ is then fed to the calculator 13.

The calculator 13 multiplies the motion direction $Vx1$, set by the motion direction and assessment range setting unit 3 and provided through the delay circuit 12, by the output $(\alpha1/(\alpha0+\alpha1))$ of the calculator 11, and the resulting product $(\alpha1/(\alpha0+\alpha1)\times Vx1)$ is fed to the calculator 18 through the delay circuit 16.

The calculator 15 reads the motion vector $Vx0$ of the pixel of interest from the motion direction memory 14, and multiplies the motion vector $Vx0$ by the output $(\alpha0/(\alpha0+\alpha1))$ of the calculator 8. The resulting product $(\alpha0/(\alpha0+\alpha1)\times Vx0)$ is fed to the calculator 18 through the delay circuit 17.

The calculator 18 thus sums the products $(\alpha1/(\alpha0+\alpha1)\times Vx1)$ and $(\alpha0/(\alpha0+\alpha1)\times Vx0)$ respectively supplied through the delay circuits 16 and 17, and the resulting sum is thus determined as an update Vx2 of the motion direction Vx0 of the pixel of interest stored in the motion direction memory 14.

Specifically, the motion direction Vx0 of the pixel of interest stored in the motion direction memory 14 and a set motion direction Vx1 are subjected to a weighted sum operation with the scores α0 and α1 accounted for as the weights thereof to result in a motion direction Vx2 as expressed by the following equation.

$$Vx2=(\alpha 0/(\alpha 0+\alpha 1))\times Vx0)+(\alpha 1/(\alpha 0+\alpha 1))\times Vx1) \qquad (2)$$

The process goes to step S7. The calculator 18 supplies the motion direction Vx2, determined according to equation (2), to the motion direction memory 14, and is substituted for (overwrites) the motion direction Vx0 of the pixel of interest stored therein. When a motion direction and an assessment range thereof are newly set, the newly stored motion direction Vx2 is read and updated in the same way as the motion direction Vx0 of the pixel interest stored in the motion direction memory 14 was read and updated.

The process goes to step S8. The score α2, determined according to equation (1), is fed to the score memory 5 through the delay circuit 9, and is substituted for the score α0 of the pixel of interest stored in the score memory 5. When the motion direction and the assessment range thereof are set for the pixel of interest, the newly stored score α2 is read and updated in the same way as the score α0 of the pixel of interest stored in the score memory 5 was read and updated.

The process goes to step S9. The controller determines whether all motion directions and the assessment ranges thereof have been set. When the controller determines that all motions and the assessment ranges thereof have not yet been set, the process returns to step S4. The same process as described above will be repeatedly performed on unset motion directions and the assessment ranges thereof.

When the controller determines in step S9 that all motion directions and the assessment ranges thereof have been set, the process goes to step S10. The controller determines whether each of the pixels in the frame of interest has been processed as a pixel of interest. When the controller determines in step S10 that all pixels in the frame of interest have not been processed as a pixel of interest, the process goes to step S3. Pixels, from among the pixels in the frame of interest, left unprocessed as a pixel of interest, are subjected to the same process as described above.

When the controller determines in step S10 that all pixels have been processed as a pixel of interest, i.e., when the final motion directions of the pixels in the frame of interest are stored in the motion direction memory 14, the motion direction detection process is completed.

The scores of the motion directions of pixels in the motion direction line across a plurality of frames are determined and then employed as weights to perform a weighted sum. The final motion direction of each pixel is thus determined. Given moving pixels are thus effectively used to determine the motion direction of the pixel of interest. As a result, an accurate motion direction is determined even if an image is subject to noise, and robustness of the calculation is improved.

The final motion direction is determined by summing a plurality of motion directions set by the motion direction and assessment range setting unit 3, with the scores for the motion directions used as the weights therefor. A high reliable motion vector is thus estimated. This arrangement requires no recursive process in which a motion vector is again corrected by estimated motion vectors in space in the vicinity of the motion direction. As a result, the final motion direction is determined within a short period of time.

The magnitude of the assessment range is fixed to 20 frames in the above discussion. The magnitude of the assessment range may be modified in accordance with the distance between the end point of the assessment range and the pixel of interest.

The assessment range is shifted in the motion direction line from the start point to the end point at steps of one frame. Alternatively, the assessment range may be shifted within a particular range. The amount of shifting at one time may be two or more frames.

The score calculator 4 calculates the variance of the pixels within the assessment range including the pixel of interest. Alternatively, the score calculator 4 calculates the variance of the pixels within the assessment range only, and regards the reciprocal of the variance as a score.

No particular initial values for the score memory 5 and the motion direction memory 14 have not been discussed. Since the scores and the motion directions are summed up, the effect of the initial values is not significant unless extremely large initial values are used. Specifically, when the initial values for the score memory 5 and the motion direction memory 14 are zero, for instance, the score and the motion direction determined from the pixel within the assessment range set by the motion direction and assessment range setting unit 3 are initially stored. The scores and the motion directions determined from the pixels within the assessment range successively set are thereafter summed up. Through summing, the score memory 5 stores a correct score of the motion direction of each pixel within the frame memory stored in the motion direction memory 14, and the motion direction memory 14 stores a correct motion direction for each pixel within the frame of interest.

The results of a simulation of the motion direction detection process, conducted by the inventors of this invention, are now discussed.

Figure 8:
FIG. 8 is an intermediate gray-shade photograph of the frame of interest in an image used in the simulation of the embodiment of the present invention, presented on a display.

Referring to FIG. 2, the simulation treats a moving image of YUV (4:2:2) of 60 frames, representing the truck, moving from left to right on a still background at a constant speed of about 14 pixels/frame. A 31st frame of the 60 frames is now a frame of interest. FIG. 8 shows the 31st frame as the frame of interest.

This simulation subjects the luminance (Y) only of YUV to the motion direction detection process. The motion direction and assessment range setting unit 3 successively sets the motion direction Vx1 to be within an integer range of −16 to 16.

Figure 9A:
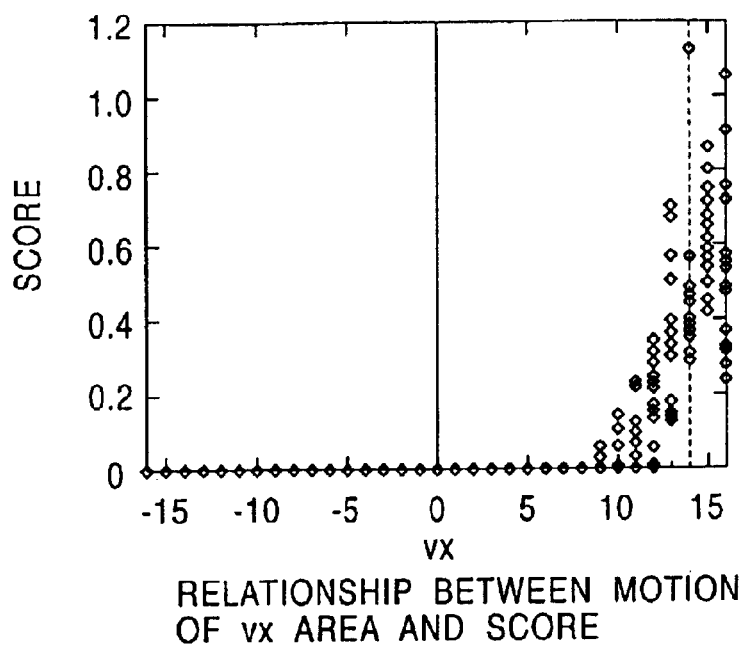
FIG. 9A is a graph showing the relationship between the motion direction and the score in a moving area resulting from the simulation of the embodiment of the present invention.
Figure 9B:
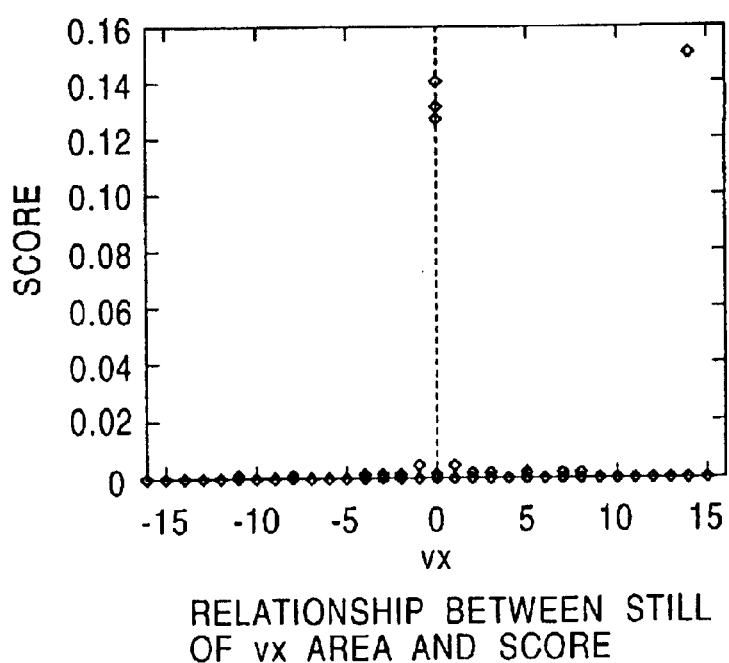
FIG. 9B is a graph showing the relationship between the motion direction and the score in a still area resulting from the simulation of the embodiment of the present invention.

FIG. 9A and FIG. 9B show relationships that are respectively obtained under the above conditions between the motion directions Vx1 of the pixels in a motion area or a still area in a frame of interest and the scores of the motion directions Vx1.

Specifically, FIG. 9A shows the relationship between the motion directions Vx1 of the pixels in the motion area and the scores thereof, and FIG. 9B shows the relationship between the motion directions Vx1 of the pixels in the still area and the scores thereof.

Referring to FIG. 9A and FIG. 9B, a plurality of scores (represented by small diamonds as shown) are shown for a single motion direction Vx1. A plurality of assessment ranges are set for the single motion direction Vx1 in a manner such that the assessment range is shifted in the motion direction line. Therefore, the plurality of the scores result from the plurality of these assessment ranges (although there appear single scores in FIG. 9A and FIG. 9B, a plurality of scores, resulting from respective single motion directions Vx1, is simply stacked one on top of another).

The pixels in a motion area (FIG. 9A) result in large scores at or in the vicinity of a motion direction Vx1 of 14 pixels/frame. The pixels in a still area (FIG. 9B) result in large scores at or in the vicinity of a motion direction of zero pixels/frame. It is thus understood that a large score results in the true motion direction of each pixel. By summing the motion directions with the scores thereof used as the weights therefor, the motion direction of each pixel substantially equal to a true motion direction is obtained.

Figure 10:
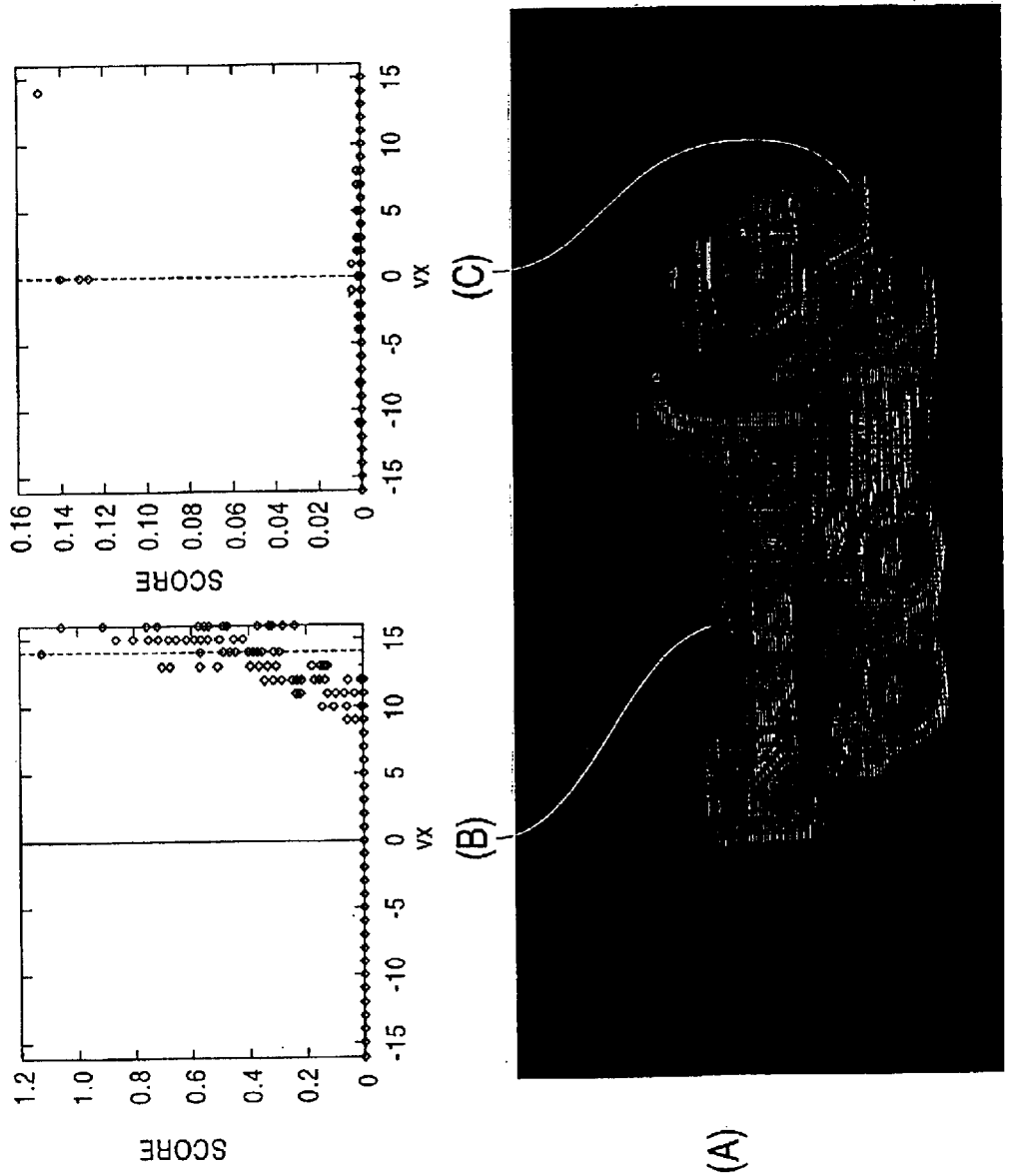
FIG. 10A is a photograph in which the result of motion vector calculation obtained from the simulation of the embodiment of the present invention is presented in gray shades on a display.
FIG. 10B is a graph showing the relationship between the motion direction and the score in the motion vector calculation of the moving area in FIG. 10A.
FIG. 10C is a graph showing the relationship between the motion direction and the score in the motion vector calculation of the still area in FIG. 10A.

FIG. 10A shows the frame of interest, shown in FIG. 8, in a gray shade (lightness) corresponding to the motion direction finally determined for each pixel. A light portion in FIG. 10A is a portion that has a large magnitude of the motion direction (a large movement in a horizontal direction). A dark portion in FIG. 10A is a portion that has a small magnitude of the motion direction (a small movement in a horizontal direction). (A gray portion represents a magnitude of motion direction of 14 pixels/frame, and a black portion represents a magnitude of motion direction of zero pixel/frame.) As shown, the shape of the truck is accurately reproduced, and a moving foreground, namely, the truck, is accurately separated from the still background.

FIG. 10B and FIG. 10C, respectively corresponding to the motion area and the still area in FIG. 10A, show the relationships between the motion directions Vx1 of the pixels in the motion area or of the pixels in the still area and the scores thereof.

Figure 11:
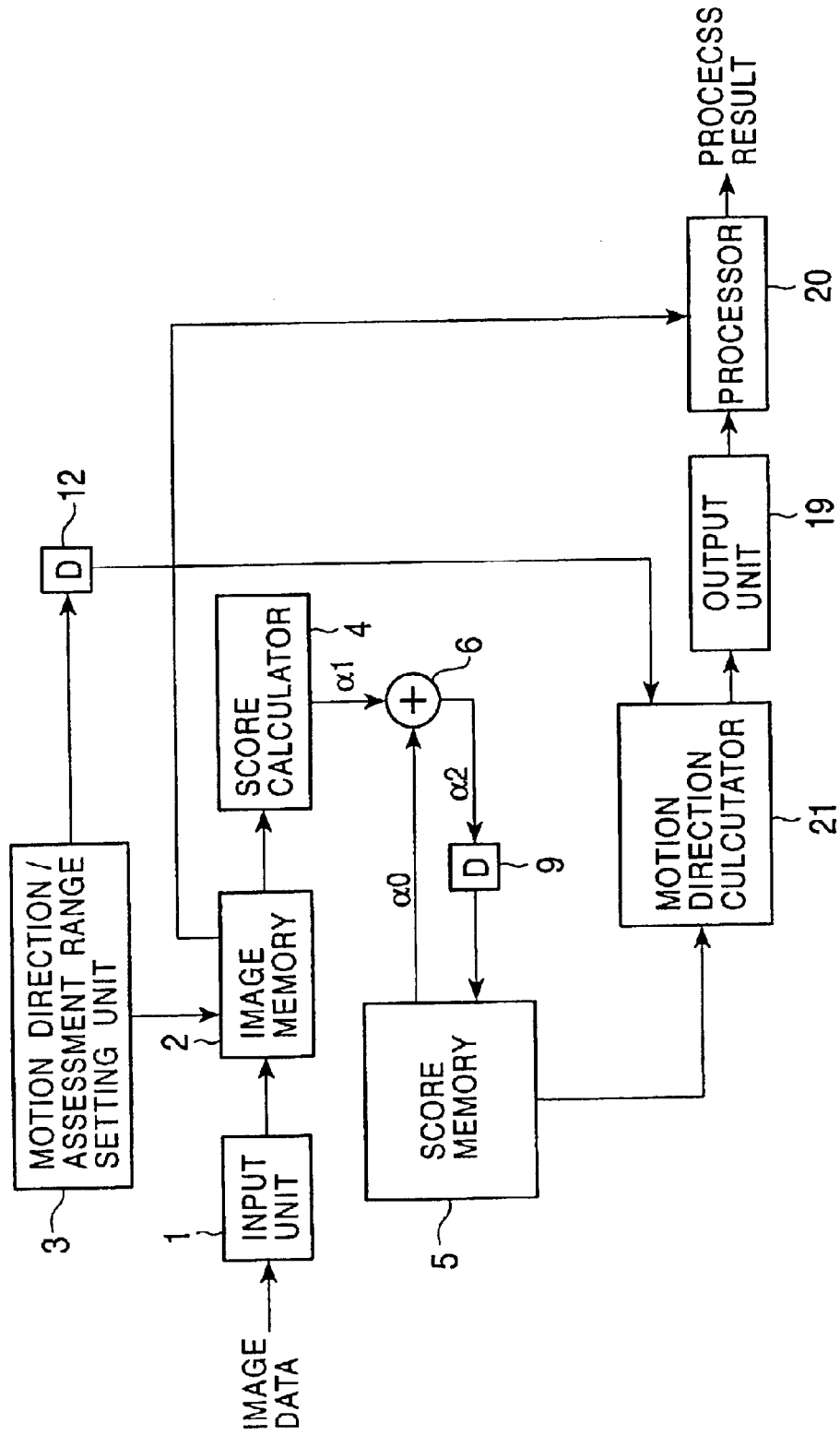
FIG. 11 is a block diagram showing an image processing device of a second embodiment of the present invention.

FIG. 11 shows a second embodiment of the image processing device in which the present invention is implemented. Components identical to those described with reference to FIG. 1 are designated with the same reference numerals. The discussion thereabout is not repeated here. The image processing device shown in FIG. 11 dispenses with the calculators 7, 8, 11, 13, 15, and 18, the delay circuits 10, 16, and 17, and the motion direction memory 14. A motion direction calculator 21 is newly added. The rest of the second embodiment remains unchanged from the first embodiment shown in FIG. 1.

Figure 12:
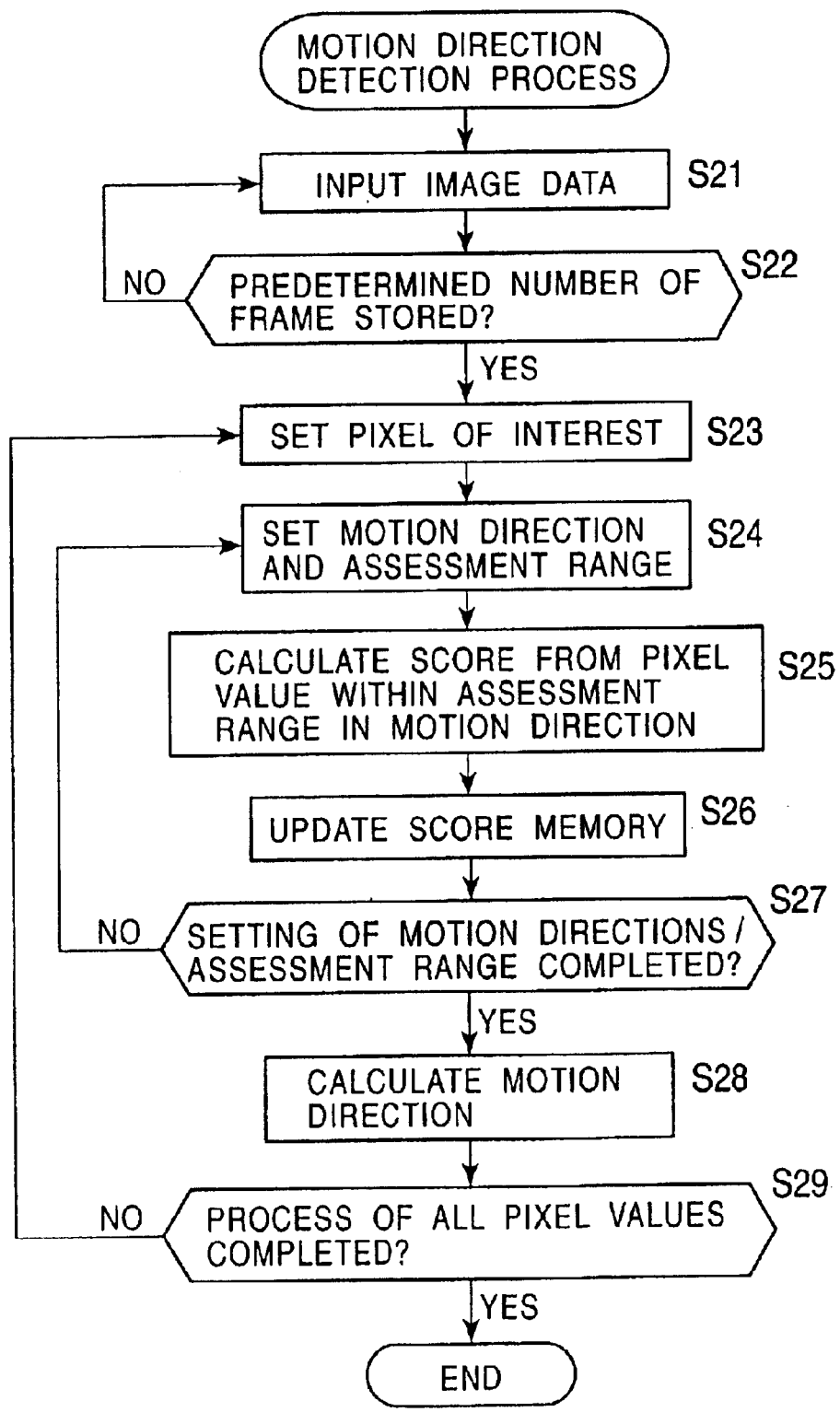
FIG. 12 is a flow diagram explaining a motion direction processing by the image processing device of FIG. 11.

The motion direction detection process carried out by the image processing device shown in FIG. 11 is now discussed, referring to a flow diagram shown in FIG. 12.

Steps S21 through S23 perform the same processing steps respectively performed in steps S1 through S3 shown in FIG. 5. The process then goes to step S24. The motion direction and assessment range setting unit 3 sets a motion direction of a pixel of interest and an assessment range thereof.

As discussed with reference to FIG. 7, the image processing device shown in FIG. 1 sets a motion direction and an assessment range thereof, then sets another motion direction and another assessment range thereof, and successively repeats this process. The image processing device shown in FIG. 11 sets a motion direction, and an assessment range thereof, sets another assessment range (shifts the assessment range), and repeats this process until all assessment ranges in the motion direction are set. The image processing device then sets another motion direction.

The motion direction and assessment range setting unit 3 first sets a motion direction as shown in FIG. 7A, and then sets, as an assessment range, a pixel range in a motion direction line L1 of the motion direction starting at a frame of a start point and extending through a predetermined number of frames. Referring to FIG. 7C, the motion direction and assessment range setting unit 3 sets the same preceding motion direction, and then sets, as an assessment range, a pixel range in the motion direction line L1 of the motion direction starting at a frame subsequent the frame of the start point and extending through a predetermined number of frames. The same process is then repeated until one end of the assessment range reaches the end point of the motion direction line L1.

When the one end of the assessment range reaches the end point of the motion direction line L1, another motion direction is set as shown in FIG. 7B. The motion direction and assessment range setting unit 3 sets, as an assessment range, a pixel range in the motion direction line L2 of the motion direction starting from the frame of the start point and extending through the predetermined number of frames. Referring to FIG. 7D, the motion direction and assessment range setting unit 3 sets the same preceding motion direction, and then sets, as an assessment range, a pixel range in the motion direction line L2 of the motion direction starting at a frame subsequent the frame of the start point and extending through a predetermined number of frames. The setting of the motion direction and the assessment range is thereafter repeated in the same way.

When the motion direction Vx1 and the assessment range are set in step S24, the motion direction Vx1 is output to the delay circuit 12, and is delayed by a predetermined duration of time by the delay circuit 12, and is fed to the motion direction calculator 21. The pixels within the assessment range are read together with the pixel of interest from the image memory 2, and are then fed to the score calculator 4.

The score calculator 4 calculates the variance of the pixel within the assessment range and the pixel of interest from the image memory 2, and outputs the reciprocal of the variance as the score $\alpha 1$ of the motion direction Vx1. The score $\alpha 1$ is then fed to the calculator 6.

The calculator 6 is then supplied with the score $\alpha 0$ of the motion direction of the pixel of interest from the score memory 5. The calculator 6 sums the score $\alpha 0$ and the score $\alpha 1$ from the score calculator 4, in other words, updates the score $\alpha 0$ stored in the score memory 5 to be the score $\alpha 2$ using the score $\alpha 1$ right now obtained in the score calculator 4, according to equation (1). The new score $\alpha 2$ is fed to the score memory 5 through the delay circuit 9.

In step S26, the score memory 5 stores the score $\alpha 2$ from the delay circuit 9, replacing the stored score $\alpha 0$ of the pixel of interest. When a motion direction and an assessment range of the pixel of interest are newly set, the score $\alpha 2$ is then read and updated in the same manner as the score $\alpha 0$ was read and updated.

In step S27, the controller determines whether all combinations of the motion directions and the assessment ranges thereof have been set. When the controller determines that all combinations have not been set, the process returns to step S24, and the same processing steps are repeated until unset combinations of the motion directions and the assessment ranges are completed.

When the controller determines in step S27 that all combinations of the motion directions and the assessment ranges have been set, the process goes to step S28. The motion direction calculator 21 calculates the final motion direction.

The motion direction calculator 21 is supplied, via the delay circuit 12, with the motion direction set by the motion direction and assessment range setting unit 3 (although the motion direction and assessment range setting unit 3 sets the same motion direction a plurality of times, the motion direction calculator 21 is supplied with the same motion direction only one time). The motion direction calculator 21 is also supplied with the score (the sum resulting from the operation defined by equation (1)) for each motion direction stored in the score memory 5.

The motion direction calculator 21 sums a plurality of (types of) motion directions set by the motion direction and assessment range setting unit 3 with the scores for the respective motion directions from the score memory 5 used as the weights for the respective motion directions, and the resulting weighted sum becomes a final motion direction.

For simplicity, three types of motion directions V1, V2, and V3, and scores $\alpha V1$, $\alpha V2$, and $\alpha V3$ therefor are now considered. The motion direction calculator 21 determines the final motion direction Vfinal according to the following equations (3) and (4).

$$V'=\alpha V1/(\alpha V1+\alpha V2) \times V1+\alpha V2/(\alpha V1+\alpha V2) \times V2$$

$$\alpha'=V1+\alpha V2$$

$$V\text{final}=\alpha'V1/(\alpha'+\alpha V3) \times V'+\alpha V3/(\alpha'+\alpha V3) \times V3 \quad (3)$$

$$V\text{final} = \alpha V1/(\alpha V1+\alpha V2+\alpha V3) \times V1 + \quad (4)$$
$$\alpha V2/(\alpha V1+\alpha V2+\alpha V3) \times V2 +$$
$$\alpha V3/(\alpha V1+\alpha V2+\alpha V3) \times V3$$

where equations (3) and (4) are equivalent.

The process then goes to step S29. The controller determines whether all pixels in the frame of interest have been processed as a pixel of interest. When the controller determines in step S29 that all pixels in the frame of interest have not been processed as a pixel of interest, the process returns to step S23. The same processing steps are repeated to pixels within the frame of interest, which need processing as a pixel of interest.

When the controller determines in step S29 that all pixels within the frame of interest have been processed, i.e., when the motion direction calculator 21 determines the final motion directions of all pixels within the frame of interest, the motion direction detection process ends.

The motion direction of each pixel within the frame of interest determined by the motion direction calculator 21 is read by the output unit 19.

In principle, the image processing devices shown in FIG. 1 and FIG. 11 result in the same motion direction for each pixel within the frame of interest. However, a difference occurs between the image processing devices shown in FIG. 1 and FIG. 11, when the motion direction detection process is executed through a computer program.

Specifically, in the motion direction detection process performed by the image processing device shown in FIG. 11, the motion direction is fixed with the assessment range being shifted in the course of setting the motion direction and the assessment range. The scores are successively obtained from the pixels within different assessment ranges in one motion direction. Since the motion direction remains unchanged, the sum remains identical to an original motion direction even if the summing operation is performed using the scores determined from the different assessment ranges as the weights with respect to the same motion direction. Even if a new combination of a motion direction and an assessment range thereof is set up in this case, there is no need for updating the motion direction. The final motion direction of the pixel of interest is determined after all combinations of the motion directions and the assessment ranges are set. The score of the motion direction set for each pixel of interest needs to be continuously stored until the final motion direction is determined. In this case, an array variable for storing the score for each motion direction is required. The array variable becomes large as the number of the motion directions set by the motion direction and assessment range setting unit 3 increases.

In the motion direction detection process carried out by the image processing device shown in FIG. 1, each time a combination of a motion direction and an arrangement range is newly added, the motion direction of the pixel of interest (the motion direction stored in the motion direction memory 14) is updated. The final motion direction of the pixel of interest is determined after all combinations of the motion directions and the assessment ranges are set. Unlike the arrangement shown in FIG. 11, there is no need for storing the score for each motion direction for each pixel of interest.

The score of the motion direction set for each pixel of interest is used as a weight to update the motion direction stored in the motion direction memory 14. When the updating is successively performed as in the arrangement shown in FIG. 1, the storing of the score for the motion direction set for the pixel of interest is not required any longer. Unlike the arrangement shown in FIG. 11, there is no need for the array variable, which varies in response to the number of the motion directions set by the motion direction and assessment range setting unit 3. The corresponding computer program is thus easily produced.

Figure 13:
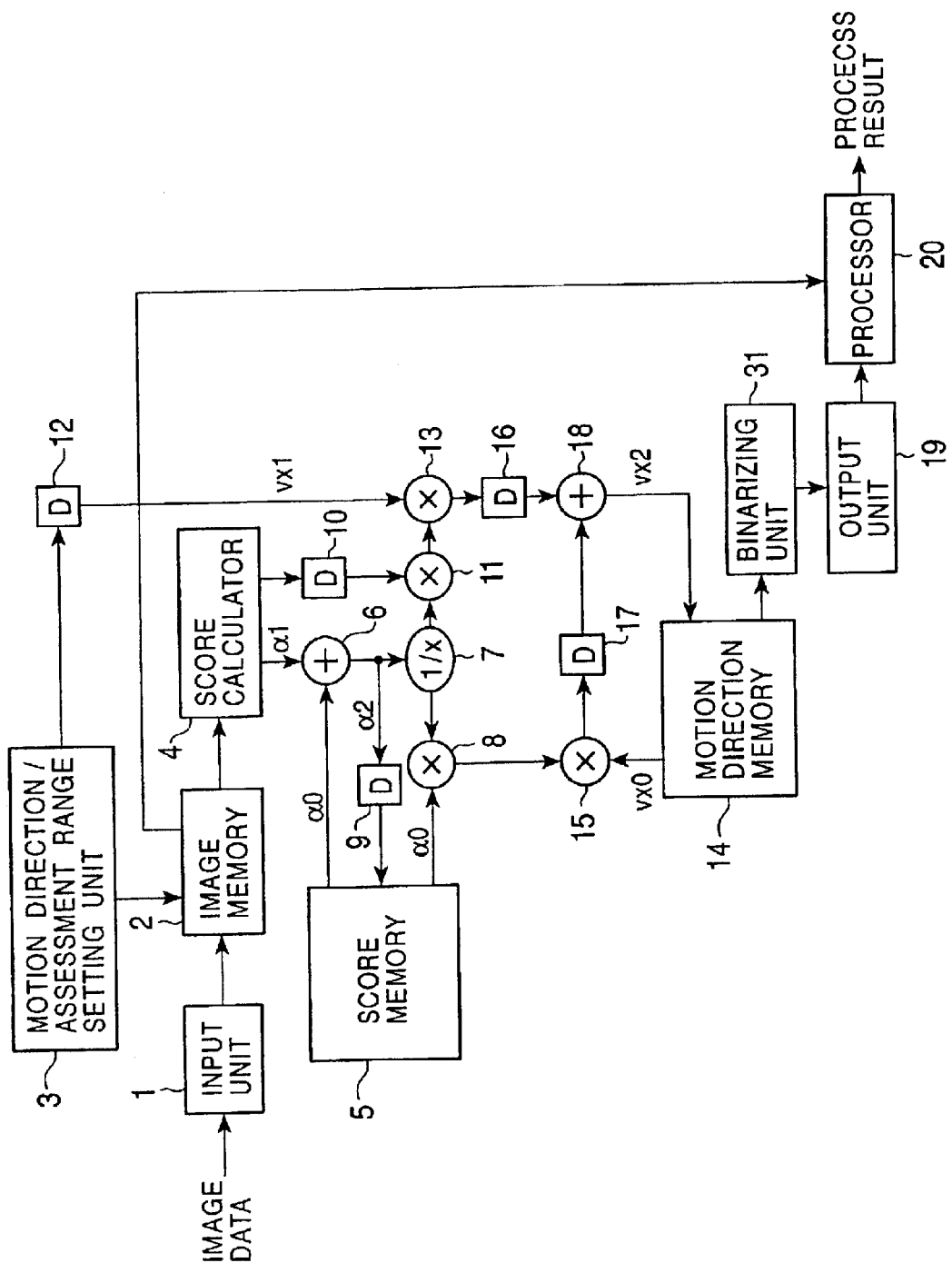
FIG. 13 is a block diagram showing an image processing device of a third embodiment of the present invention.

FIG. 13 shows a third embodiment of the image processing device of the present invention. Components identical to those described with reference to FIG. 1 are designated with the same reference numerals, and the discussion thereabout is not repeated here. The image processing device of FIG. 13 includes a binarizing unit 31 between the motion direction memory 14 and the output unit 19, and the rest of the third embodiment is identical to the first embodiment shown in FIG. 1.

The binarizing unit 31 discriminates between a motion area and a still area, based on the final motion direction of each pixel in the frame of interest. Specifically, the binarizing unit 31 discriminates between the motion area and the still area in the frame of interest by comparing the motion direction stored in the motion direction memory 14 with a predetermined threshold to binarize the motion direction. The coordinates of the pixels forming the motion area and the still area are then supplied to the output unit 19. The predetermined threshold may be the mean motion direction of the pixels of the frame of interest, or may be the motion direction that divides in half the area of a histogram of the pixels along the motion direction.

As already discussed, the final motion direction of each pixel in the frame of interest, stored in the motion direction memory 14, is highly accurate. Based on the highly accurate motion direction, the motion area and the still area are discriminated. Based on the highly accurate motion direction, the image processing device precisely discriminates between the motion area, namely, a moving object, and the still area, namely, a still object, from the frame of interest.

The third embodiment performs the motion direction detection process in frame units, but may perform the detection process in field units.

In the third embodiment, the score of the motion direction set for the pixel of interest is determined using the pixels present in the motion direction line only. Alternatively, pixels within a block (as large as a 3×3 pixel block) centered on the pixel present in the motion direction line may be used for determination. The robustness of the calculation is thus increased.

In the third embodiment, the processor 20 and the binarizing unit 31 perform the final motion direction stored in the motion direction memory 14. The processor 20 and the binarizing unit 31 may process not only the final motion direction stored in the motion direction memory 14 but also the score of the final motion direction finally stored in the score memory 5. The processor 20 and the binarizing unit 31 may process only the motion directions having a high score.

In the third embodiment, the score of the motion direction is obtained based on the pixels present in the motion direction line passing through the pixel of interest. Alternatively, the score of the motion direction may be obtained based on the pixels present in a curve to which the motion direction line is tangential and which passes through the pixel of interest. With this arrangement, the movement of a shape-changing object and the movement of a speed-changing object may be detected.

In the third embodiment, an assessment range is set for a motion direction so that a plurality of assessment ranges are set for the single motion direction. Alternatively, the score may be determined using all pixels present in the motion direction line, without setting no assessment ranges. Specifically, a single score may result from a single motion direction. There are times when about half the pixels along the motion direction line constitute a foreground (having no moving area) while the remaining pixels constitute the background (having a moving area), depending on the motion direction. In this case, if all pixels present in the motion direction line are used to determine the score of the motion direction, the score becomes substantially large. In other words, the score becomes large with all pixels present in the motion direction line even if the motion direction is incorrect. It is therefore preferred that the score of the motion direction be determined with respect to each assessment range with the assessment range set along the motion direction line.

The series of processing steps may be performed using hardware or software. When the series of processing steps are performed using software, a program for the software is installed in general-purpose computers.

Figure 14:
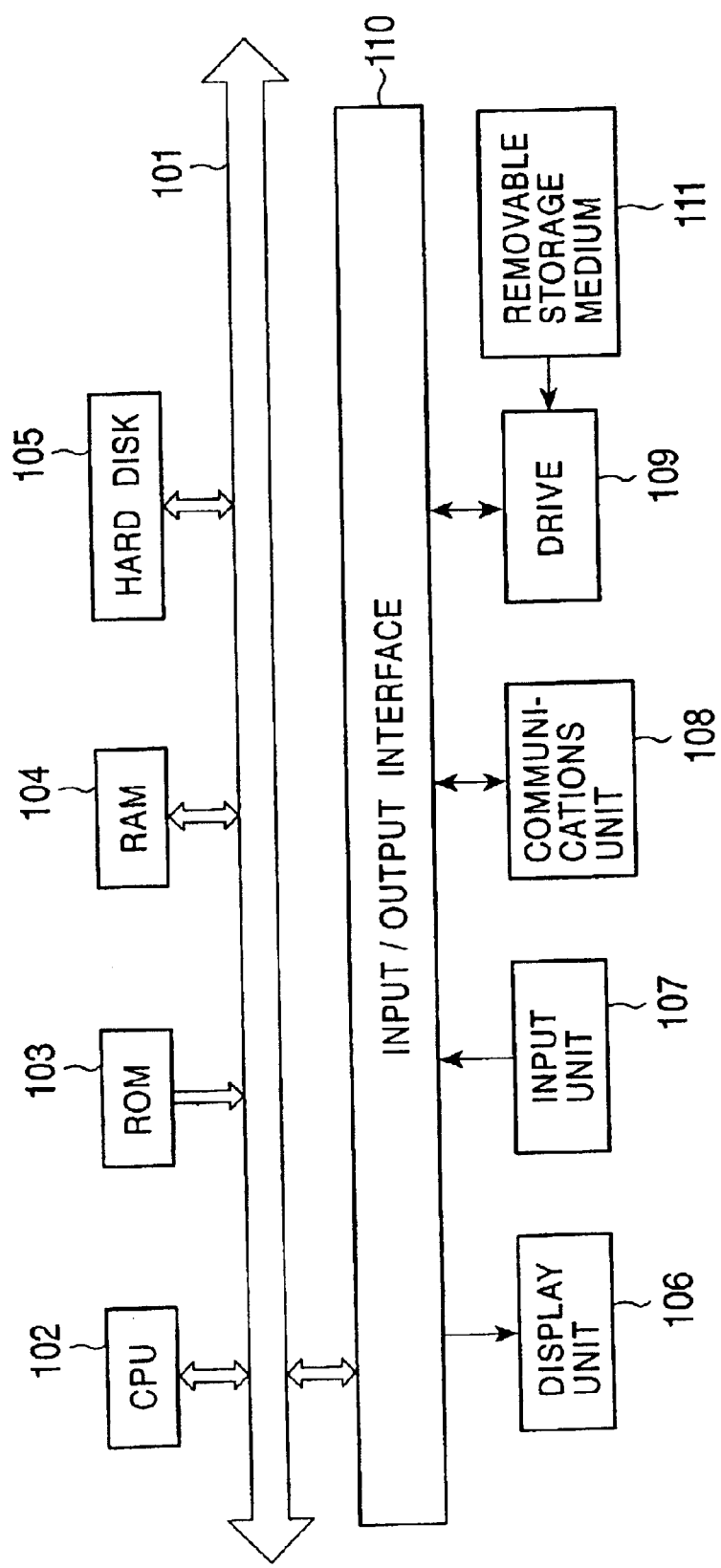
FIG. 14 is a block diagram of a computer that executes the method of the present invention in software.

FIG. 14 shows one embodiment of such computer in which the program for carrying out the series of processing steps is installed.

The program may be stored in advance in a hard disk 105 or ROM (Read Only Memory) 103, as a storage medium built in the computer.

The program may be stored temporarily or semi-permanently in a removable storage medium 111, such as a floppy disk, a CD-ROM (Compact Disc Read Only Memory), an MO (Magneto-Optical) disc, a DVD (Digital Versatile Disc), a magnetic disc, a semiconductor memory, a magnetic memory, or an optical memory. The removable storage medium 111 may be supplied in package software.

The program is installed into the computer using the above-referenced removable storage medium 111. Alternatively, the program is sent to the computer from a download site via a digital communications broadcast satellite or via a radio link, or by wire for a network such as LAN (Local Area Network) or the Internet. The program is received at the communications unit 108 of the computer and is installed into the hard disk 105 built in the computer.

The computer includes a CPU (Central Processing Unit) 102. The CPU 102 connects to an input/output interface 110 via a bus 101. The CPU 102 executes a program stored in the ROM 103 when the user operates an input unit 107, such as a keyboard or a mouse, to input a command through the input/output interface 110. The CPU 102 loads into a RAM (Random Access Memory) 104, a program stored in the hard disk 105, or a program which is transferred via the satellite or the network, received at the communications unit 108, and then installed into the hard disk 105, or a program that is read from the removable storage medium 111 mounted in the drive 109 and then installed into the hard disk 105. The CPU 102 thus executes the program in accordance with the above-referenced flow diagrams or the process using the arrangement discussed with reference to the block diagrams. The CPU 102 presents the output, as required, via the input/output interface 110 to an output unit 106 such as an LCD (Liquid-Crystal Display) or an loudspeaker, or transmits the output from the communications unit 108, or stores the output in the hard disk 105.

The processing steps describing the program to be performed by the computer are not necessarily performed in the time series sequence described in the flow diagrams. The processing steps may be performed concurrently in parallel or individually (for instance, through parallel processing or object processing).

The program may be executed by a single computer or by a plurality of computers for distributed processing. The program may be transmitted to a remote computer for processing there.

In accordance with the image processing device and the image processing method of the present invention, the score is calculated for each of a plurality of motion directions for each pixel of interest, for pixels present in the motion direction on a plurality of screens. By processing the plurality of motion directions using the scores therefor, the final motion direction is calculated for each pixel of interest. A highly accurate motion direction detection process is performed within a short calculation time.

Furthermore, based on the final motion direction, the image processing device and method discriminate between the motion area and the still area in the screen of interest. The motion area and the still area are accurately extracted from an image.

What is claimed is:

1. An image processing device for determining the presence or absence of a moving area in a predetermined screen of interest from among a plurality of time series screens, the image processing device comprising:

score calculating means for calculating a score corresponding to each of a plurality of motion directions of pixels in the predetermined screen of interest, based on pixels present in the motion direction across the plurality of the time series screens so that a plurality of scores are calculated for each pixel;

motion direction calculating means for calculating the motion direction of each pixel in the predetermined screen of interest, by processing the plurality of the motion directions based on the plurality of scores corresponding to the plurality of the motion directions respectively; and determining means for determining the presence or absence of the moving area based on the motion direction calculated by the motion direction calculating means.

2. An image processing device according to claim 1, further comprising:

direction setting means for setting the plurality of the motion directions of each pixel in the screen of interest; and range setting means for setting a range of extraction for extracting the pixels in the plurality of the screens present in the motion direction set by the direction setting means to calculate the score for each motion direction, wherein the score calculating means calculates the score of the motion direction, based on the pixels within the range set by the range setting means, from among the pixels of the plurality of screens present in the motion direction set by the direction setting means.

3. An image processing device according to 2, wherein the range setting means shifts, in the motion direction, the range of the pixels which is used for calculating the score of the motion direction, and
the score calculating means calculates the score for each range of the pixels shifted in the motion direction, and calculates a final score of the motion direction based on the resulting scores.

4. An image processing device according to claim 3, wherein the calculating means calculates the score for each range of the pixels shifted in the motion direction, and sums the scores, thereby calculating a final score for the motion direction.

5. An image processing device according to claim 2, further comprising score memory means for storing the score of each pixel in the screen of interest, and
score updating means for updating the score stored in the score memory means, based on the score determined from the pixels present in the motion direction set by the direction setting means.

6. An image processing device according to claim 5, wherein the score updating means updates the score stored in the score memory means by summing thereto the score that is determined from the pixels present in the motion direction set by the direction setting means.

7. An image processing device according to claim 2, wherein the direction setting means for successively setting the motion directions, comprises:
motion direction memory means for storing the motion direction of each pixel in the screen of interest, and
motion direction updating means for updating the motion direction stored in the motion direction memory means with the motion direction newly set by the direction setting means.

8. An image processing device according to claim 2, wherein the score calculating means regards, as the score of the motion direction, the reciprocal of a variance of the pixel values of the pixels within a range set by the range setting means, from among the pixels of the plurality of the screens present in the motion direction set by the direction setting means.

9. An image processing device according to claim 1, wherein the determining means detects the moving area in the screen of interest by binarizing the motion direction.

10. An image processing device according to claim 1, wherein the determining means detects the still area in the screen of interest by binarizing the motion direction.

11. An image processing device according to claim 1, wherein the determining means determines the presence or absence of the moving area by binarizing the mean of the motion directions of the pixels in the screen of interest.

12. An image processing device according to claim 1, wherein the determining means determines the presence or absence of the moving area, based on the motion directions of the pixels having the scores thereof higher than a predetermined threshold, in the screen of interest.

13. An image processing device according to claim 1, the score calculating means calculates the scores of the plurality of the motion direction of each pixel in the predetermined screen of interest, based on a plurality of image blocks in each motion direction of the plurality of the time series screens.

14. An image processing device according to claim 1, further comprising memory means for storing moving image data composed of a plurality of time series screens, wherein the score calculating means calculates the scores of the plurality of the motion directions of the pixels in the predetermined screen of interest, based on the pixels present in the motion direction in all of the time series screens stored in the memory means.

15. An image processing device for determining the presence or absence of a moving area in a predetermined screen of interest from among a plurality of time series screens, the image processing device comprising:
score calculating means for calculating a score corresponding to each of a plurality of motion directions of pixels in the predetermined screen of interest, based on pixels present in the motion direction across the plurality of the time series screens;
motion direction calculating means for calculating the motion direction of each pixel in the predetermined screen of interest, by processing the plurality of the motion directions based on the scores corresponding to the plurality of the motion directions;
determining means for determining the presence or absence of the moving area based on the motion direction calculated by the motion direction calculating means;
direction setting means for setting the plurality of the motion directions of each pixel in the screen of interest; and
range setting means for setting a range of extraction for extracting the pixels in the plurality of the screens present in the motion direction set by the direction setting means to calculate the score for each motion direction,
wherein the score calculating means calculates the score of the motion direction, based on the pixels within the range set by the range setting means, from among the pixels of the plurality of screens present in the motion direction set by the direction setting means,
wherein the direction setting means for successively setting the motion directions, comprises:
motion direction memory means for storing the motion direction of each pixel in the screen of interest, and
motion direction updating means for updating the motion direction stored in the motion direction memory means with the motion direction newly set by the direction setting means, and
wherein the motion direction updating means updates the motion direction stored in the motion direction memory means by forming a weighted sum of the motion direction stored in the motion direction memory means and the motion direction newly set by the direction setting means, with the scores corresponding to the respective motion directions accounted for as the weights therefor.

16. An image processing method for determining the presence or absence of a moving area in a predetermined screen of interest from among a plurality of time series screens, the image processing method comprising the steps of:
calculating a score corresponding to each of a plurality of motion directions of pixels in the predetermined screen of interest, based on pixels present in the motion direction across the plurality of the time series screens so that a plurality of scores are calculated for each pixel;
calculating the motion direction of each pixel in the predetermined screen of interest, by processing the plurality of the motion directions based on the plurality of scores corresponding to the plurality of the motion directions respectively; and determining the presence or absence of the moving area based on the calculated motion direction.

17. A storage medium for storing a computer executable program for determining the presence or absence of a moving area in a predetermined screen of interest from among a plurality of time series screens, the program comprising the steps of:

calculating a score corresponding to each of a plurality of motion directions of pixels in the predetermined screen of interest, based on pixels present in the motion direction across the plurality of the time series screens so that a plurality of scores are calculated for each pixel;

calculating the motion direction of each pixel in the predetermined screen of interest, by processing the plurality of the motion directions based on the plurality of scores corresponding to the plurality of the motion directions respectively, and determining the presence or absence of a moving area based on the calculated motion direction.

* * * * *